Figure 4:
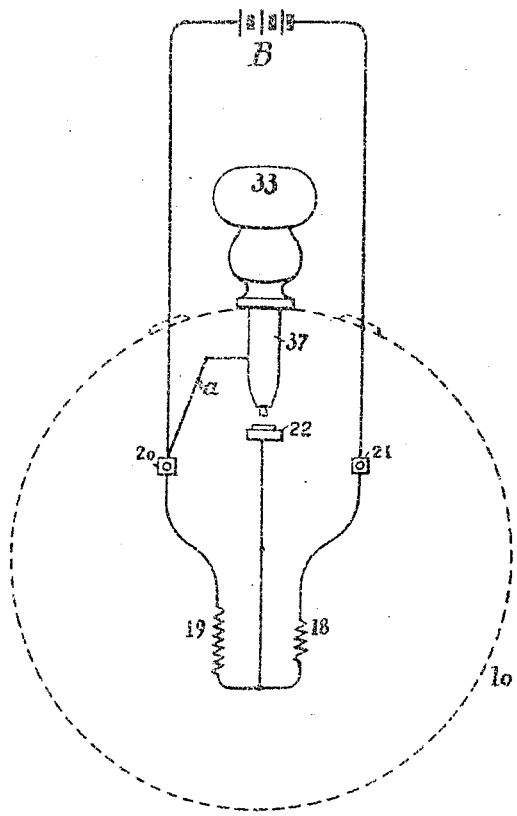

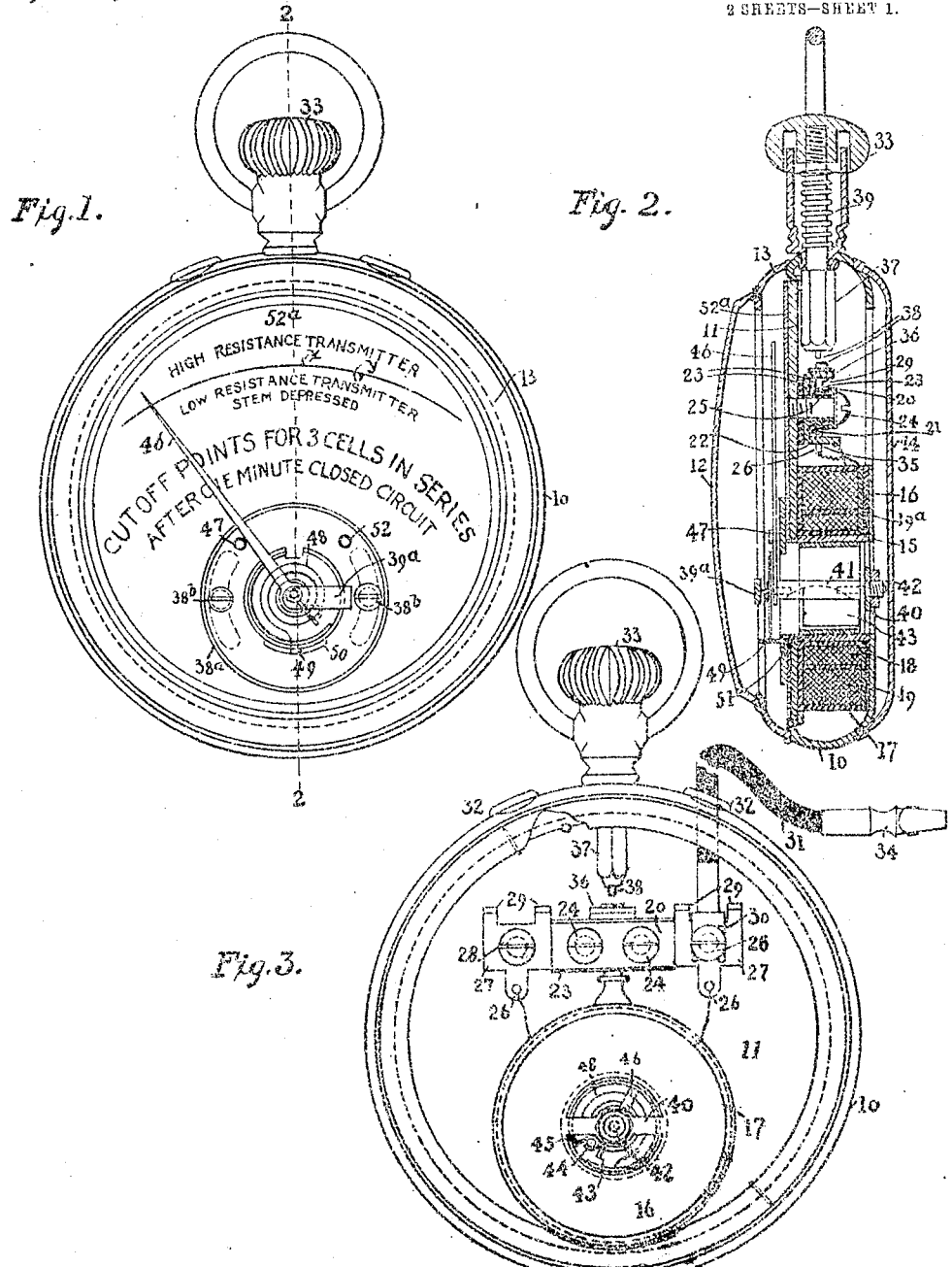

UNITED STATES PATENT OFFICE.

CHARLES J. DAVIDSON, OF HACKENSACK, NEW JERSEY, ASSIGNOR TO AMERICAN TELEPHONE AND TELEGRAPH COMPANY, A CORPORATION OF NEW YORK.

INSTRUMENT FOR TESTING BATTERIES.

1,020,541.     Specification of Letters Patent.     Patented Mar. 19, 1912.

Application filed December 14, 1909. Serial No. 533,057.

*To all whom it may concern:*

Be it known that I, CHARLES J. DAVIDSON, residing at Hackensack, in the county of Bergen and State of New Jersey, have invented certain Improvements in Instruments for Testing Batteries, of which the following is a specification.

It is often important in the use of batteries that their efficiency shall not fall much below a certain minimum before they are withdrawn from service. This is especially true of primary batteries employed at telephone substations to furnish talking current. The current flow from such batteries through the definite or known resistance of the transmitter for the average time of a telephonic conversation must be sufficiently great to provide for good transmission. It is therefore necessary that telephone inspectors, or others caring for batteries in such situations, shall have means for determining, readily and with reasonable accuracy, their condition. The present invention furnishes a measuring instrument or battery gage, suitable for this purpose, and which is also simple, compact and applicable to the testing of batteries used with apparatus of different resistance.

In the accompanying drawings, in which similar characters of reference are applied to like elements throughout. Figure 1 is a front elevation of one embodiment of the invention; Fig. 2 is a vertical section therethrough on the line 2—2 of Fig. 1; Fig. 3 is a rear elevation with the cover removed and one of a pair of connecting cords shown attached to its terminal; and Fig. 4 is a diagrammatic representation of the circuit arrangement when the instrument is in use.

To secure the greatest portability, the operating parts of my improved gage are inclosed in a casing of the watch-case type, and therefore adapted to be carried in the pocket, said casing having a body 10 provided at its front with a face plate 11 over which is a crystal 12 held in the usual bezel 13. Over the opening in the back of the casing is a removable cover 14.

Mounted upon the inner side of the face plate, which in the present instance serves as one of its heads, is a spool 15 having a rear head 16, between which and the face plate about the cylindrical core is a winding 17 disposed in sections or coils, which singly or in combination give resistances proportionate to the apparatus in circuit with the battery to be tested. For the use of telephone inspectors, for which this instrument is particularly designed, it is shown as having two coils; the inner coil 18 may have a resistance of approximately five ohms, or substantially that of a low resistance transmitter, and consist of about two hundred and seven turns of #32 enamel covered copper wire, while the outer coil 19 may be about fifteen ohms, approximating when in series with the coil 18 a high resistance transmitter, and have four hundred thirty-five turns of similar wire. The coils are insulated from one another and from the spool by paraffin paper or other suitable material indicated at 19ª.

Carried by the face plate adjacent to the spool are three terminal plates 20, 21 and 22, insulated from the face plate and from each other by strips 23 of fiber or the like. Screws 24, 24 extend through alined openings in the terminal plates and insulating strips and are threaded into the face plates, serving to secure the terminals in place and also to electrically connect the outer terminal plate 20 with the casing. Insulating bushings 25 surround the screws to prevent contact of the plates 21 and 22 therewith. The plates 20 and 21 have lugs 26 to which the outer ends of the high and low resistance coils 19 and 18 are respectively soldered. They also provide terminals for an external circuit, having lateral extensions 27 in which are threaded openings engaged by clamping screws 28. Under these screws, and projecting between pairs of lugs 29, 29 to prevent turning about the screws, may be secured suitable terminal tips 30 upon insulated flexible conductors 31, passing from the casing through openings about which are rounded protecting bushings 32. These openings are conveniently located adjacent to and upon opposite sides of the usual watch-case pendant 33. Upon the outer ends of the conductors 31 are spring clips 34 by which the gage may be attached to the battery to be tested. The third terminal plate 22 has an inner lug 35 to which the juncture of the high and low resistance coils are soldered, and an outer lug 36 projecting beneath the stem of the pendant, which has an extension 37 for coöperation with this lug, the contacting surfaces 38 being of some such metal as platinum. Normally these surfaces are held apart by a spring 39 surrounding the stem, but when the pendant is pressed inwardly these elements serve as a switch, and since the pendant, as is customary, is in metallic contact with the casing, and since the terminal plate 20 is similarly joined thereto by the screws 24, the high resistance winding 19 is short circuited, as may be understood by reference to Fig. 4, where the line $a$ indicates the entire electrical connection between the terminal 20 and the pendant.

The tubular center of the spool 15 opens through the plate 11 and there is a similar opening in the rear head. Fixed to the plate by screws 38$^b$ and surrounding the spool opening is an annular plate 38$^a$ having an arm 39$^a$ extending over the center of the spool, and across the opening in the head 16 is a bar 40. In the arm 39$^a$, at the axis of the spool, is a depression to receive the end of a pivot or shaft 41, the opposite extremity of which is seated in a similar depression in the end of a screw 42 threaded through the bar 40. Attached to the pivot within the spool is a vane or armature 43 of soft iron, which, when current traverses the coils, is repelled by a soft iron pole-piece 44 held within the spool by a curved strip 45 of non-magnetic metal frictionally engaging the tubular portion. The forward extremity of the pivot, outside the face plate, carries a hand or indicating member 46, which normally, when the armature is in proximity to the pole-piece, is maintained against a cushioned stop 47 rising from the plate 38$^a$, by a hair spring 48. This is situated between the hand and the arm 39 with its inner end attached to the pivot and its opposite end fixed to a post 49. The post passes through a curved slot 50 in the plate 38$^a$, and has an angular end 51 extending beneath the plate and clamped in place between it and the face plate by the screws 38$^b$; these screws being loosened, the position of the post in the slot may be varied to adjust the tension of the hair spring. When a current of sufficient magnitude flows through the winding, the hand is actuated by the repulsion between the pole-piece and armature and is carried toward a stop 52 similar to the stop 47. In its movement the hand is carried over a scale printed upon a face or dial 52$^a$ secured to the plate 11, this scale being here illustrated as having two graduations, $x$, $y$, indicating cut-off or rejection points for batteries associated with high and low resistance apparatus, respectively.

Considering now the use of the gage by telephone inspectors, it may be said that the spring clips of the flexible cords are attached to the terminals of the battery B to be tested, and then, if said battery is in use with a transmitter of high resistance the pendant will be allowed to remain in its raised position and the two coils are connected in series giving a resistance between the terminals 20 and 21 of twenty ohms; or, if the battery is connected with a low resistance transmitter, the pendant will be depressed and the high resistance coil short circuited through the switch members and casing, the resistance across the terminals then being five ohms. Consequently, in each instance, there will be secured the same current drain upon the battery as that to which it would be subjected in actual service. A suitable interval for the test is one minute, this being chosen instead of three minutes, the estimated average length of a telephonic conversation, to save the inspector's time, the gage being calibrated accordingly. If the test is for a high resistance transmitter battery, and the hand is deflected toward the stop 52, beyond the point $x$, and if in falling back under the influence of the diminished current flow and decreased repulsion between the pole-piece and armature, it does not reach the point $x$, it will be known that the battery is still in condition for service. If, on the contrary the hand does not reach the point $x$ upon the initial closure of the circuit or at the end of the minute is retracted by the hair spring to a point beyond it, toward the stop 47, it is an indication that the battery has reached or fallen below the minimum desired efficiency and that it should be cut out and replaced. For the test of a battery employed with a low resistance transmitter the indications are the same as in the previous case, with reference to the point $y$ instead of $x$.

Having thus described my invention, I claim:

An instrument for testing batteries which are in use with apparatus having a definite resistance, comprising a casing, an indicating member movably mounted therein, and an actuating coil the resistance of which renders the resistance of the instrument substantially equal that of the apparatus associated with the batteries to be tested.

In testimony whereof, I have signed my name to this specification in the presence of two subscribing witnesses, this ninth day of December, 1909.

CHARLES J. DAVIDSON.

Witnesses:
ALLAN GRAHAM,
R. S. SUTLIFFE.